Oct. 19, 1965   M. S. LAMBERT   3,212,147
CRIMP GRIP BELT SPLICE
Filed Oct. 7, 1963
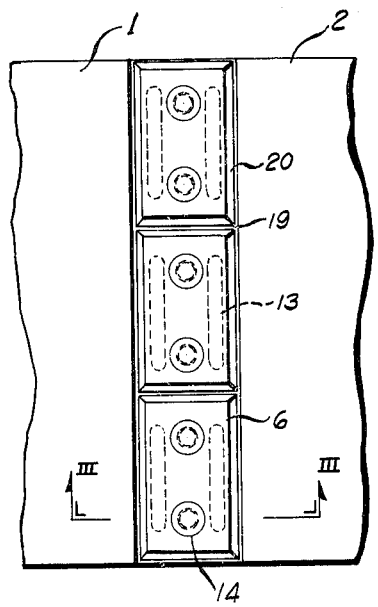
Fig. I
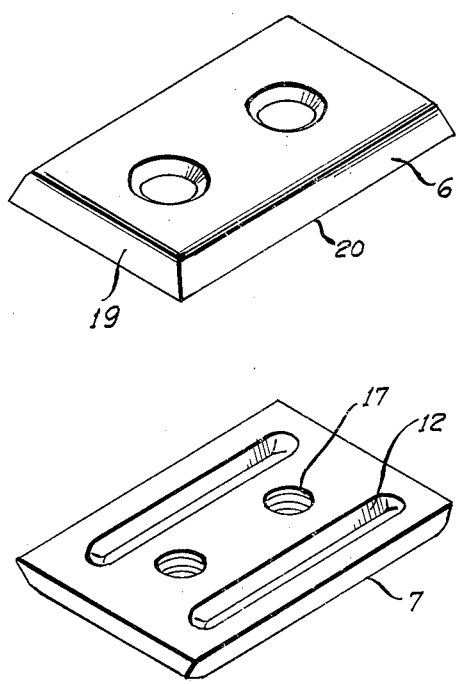
Fig. II
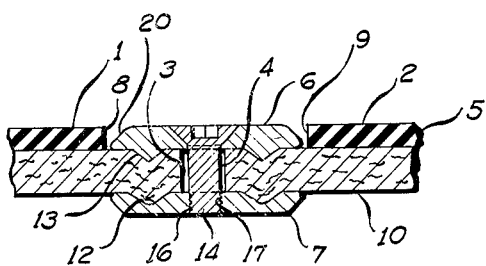
Fig. III
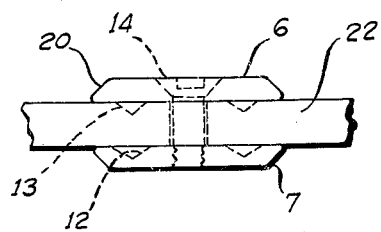
Fig. IV
INVENTOR.
Max S. Lambert
BY William B. Jaspert
Attorney

United States Patent Office 3,212,147
Patented Oct. 19, 1965

3,212,147
CRIMP GRIP BELT SPLICE
Max S. Lambert, 100 Stanwix St., Pittsburgh 22, Pa.
Filed Oct. 7, 1963, Ser. No. 314,167
1 Claim. (Cl. 24—37)

This invention relates to new and useful improvements in fastening means, commonly called a mechanical splice, for joining the ends of conveyor belts of all constructions, whether reinforced with fabric layers, interwoven cords or length-wise fabric or steel cables, etc., and having rubber or rubber-like fillers and covers, as normally used to convey all manner of bulk materials such as crushed limestone, coal, ore, etc., or for transporting parts, packages, personnel, etc.

Heretofore fasteners used for joining the two ends of a belt utilized bolts, hooks, rivets and the like to penetrate into or through the belt reinforcement, commonly referred to as carcass, or for flexible material such as rawhide lace requires holes being made in the belt for interlacing, and such metal or lace elements stand in shear against the filler or crosswise elements of the belt carcass, lacking attachment to the warp that gives the belt lengthwise strength to withstand pull, so the splice is basically weak and there is a tendency of the penetrating elements to wear through or dislodge the filler, causing what is commonly called pullout. Or in the case of taking a deeper bite on the belt end to achieve more secure anchorage against filler dislodgement and pullout, the fastener becomes too long to conform readily to terminal and bend pulley contour and the belt is forced to flex too sharply over the ends of the fastener, causing crosswise rupture of the belt.

Such fasteners also require special application tools and excessive time and labor to apply while also some have design limitations so as to require different sizes to fit different belts, involving problems of cost and procurement.

In accordance with the present invention, these difficulties are overcome by means of clamping plates which do not require penetration of the belt and may be of one size that is applicable to any belt, while affording great pull strength and durability, and being removable and reusable. The juxtaposed clamping plates grasp the belt ends for only a short distance that avoids any strain on the belt carcass when traversing pulleys. Also, the clamping plates have cooperating tongue and groove faces so as to force the belt into a loop that cannot pull out of the clamp, while gripping on the warp elements of the belt carcass so as to achieve practically 100% pull strength.

It is therefore among the objects of the invention to provide a crimp grip assembly for splicing ends of rubber filled or covered conveyor belts utilizing spaced clamping plates arranged in end-to-end relation the full width of the belt in which oppositely disposed plates are provided with tongues and grooves for crimping the ends of the belt while allowing free articulation of the belt ends to adapt them to the curvature of the drive and guide drums over which they pass.

The invention will become more apparent from a consideration of the accompanying drawing constituting a part hereof in which like reference characters designate like parts and in which:

FIGURE 1 is a top plan view of a belt splice or joint embodying the principles of this invention;

FIGURE 2 an exploded view of a pair of clamping plates;

FIGURE 3 a cross-sectional view through the clamping plates, fastening screw and the belt ends taken along the line 3—3 of FIGURE 1, and;

FIGURE 4 is a side elevational view of the belt and clamping member at the splice or joint.

With reference to the several figures of the drawing, the numerals 1 and 2 designate the ends of an endless conveyor belt more clearly shown in FIGURE 3, the ends terminating at the lines 3 and 4, FIGURE 3, leaving a space therebetween. In FIGURE 3, rubber surfacing material 5 may be cut away to form a shoulder or recess for receiving clamping plates 6 and 7 which fit between the cut ends 8 and 9 of the rubber surfacing material. The numeral 10 designates the bottom surface of the belt against which the faces of the bottom plate 6 abut. As is shown in FIGURES 2, 3 and 4, one of the elements has grooves 12 which are V shaped and do not extend the full length of the plate, although this may be done if desired. By terminating the ends of the groove 12 short of the ends of the clamping plates as shown in FIGURE 2, the clamping plates are restrained against movement in the direction of their longitudinal axis as well as in a transverse direction, as will appear obvious, and the plates themselves are given more lateral strength.

The grooves 12 of the plate 7 are wider than the tongues or projecting portions 13 of the top plate 6 so that the belt 10 will be forced into a loop by displacement when the upper and lower plates 6 and 7 are drawn together by two flat head pocket screws 14 so that considerable turning force may be applied to the screw with a socket wrench, to have its threaded end 16 act with the threaded hole 17 of the bottom plate 7 shown in FIGURE 2.

In FIGURE 1 a series of clamping plates 6 are shown in end-to-end relation, there being however a taper on the ends of the plates to avoid binding and allow flexing freedom of the joints. The number of clamping plates 6 and 7 used on a single joint depends upon the width of the belt and also of course the length of the clamping plate. A suitable length of the plate would be approximately 2½″ and the width 1½″, with the edges tapered or beveled as shown at 19 and 20 in the top plate 6 of FIGURE 2.

In FIGURE 4 the clamp of FIGURES 1 through 3 are shown applied to a belt 22 without recessing. Regardless of whether the clamps are fitted into recessed portions, as in FIGURE 3, or with their faces in clamping engagement with the surfaces of the belt 22, as in FIGURE 4, they perform the same function of interlocking the clamp plates and belt to grippingly engage the same while allowing freedom of movement to permit the joint or splice of the belt to conform to the curvature of any drive or guide pulleys or wheels over which it may have to pass.

It is evident that the clamping plates 6 and 7 with the fastening screws 14 are easily applied with a minimum of labor and without the need of jigs or other fixtures.

It is not necessary to penetrate or provide for penetration of the belt with bolts, hooks or rivets. The screws having been pre-assembled in pairs of plates and partly started so the plates stand apart, the assembly is slipped over the belt ends that have been drawn up into position, then tightening the socket screws and successively sliding fastener assemblies into place and tightening screws for the belt width, which completes the splice. Since the average splice requires about 30 of the socket screws to be tightened and making a liberal allowance of 20 seconds for each, the total time required to make the splice is less than 10 minutes, that is but a fraction of the time required for other splice procedures.

Although one embodiment of the invention has been herein illustrated and described, it will be evident to those skilled in the art that various modifications may be made in the details of construction without departing from the principles herein set forth.

I claim:

The combination with the juxtaposed end portions of a belt comprising layers of fabric and the like having a layer of rubber-like material integrally formed on a face thereof, said rubber-like material being removed adjacent the juxtaposed ends of the belt to form a clearance for clamping plates in excess of the width of the plates when the ends of the belt are joined, a plurality of clamping plates with their top faces beveled at the edges and having oppositely complementary disposed elongated tongues and elongated grooves on the clamping faces thereof disposed on opposite faces of the juxtaposed ends of said belt for clamping the portion of the belt with the rubber removed therebetween, said clamping plates having their oppositely disposed tongues and grooves terminating short of the ends of said plates and spaced inwardly of the sides thereof for crimping the ends of the belt when subjected to clamping pressure, the surface of said rubber-like material and said top faces of some of said clamping plates extending along the same plane, one of said clamping plates being recessed to receive the head of a bolt and the other clamping plate having screw threads for receiving the threaded end of the bolt, and screw bolts for joining said plates to interlock the plates and belt, the ends of the belt being spaced from said bolts to provide free articulation of the belt ends and said clamping plates being arranged across the width of said belt in end-to-end relation out of contact at adjacent ends to avoid binding.

References Cited by the Examiner

UNITED STATES PATENTS

| | | | |
|---|---|---|---|
| 308,257 | 11/84 | Heffernan | 24—37 |
| 1,918,257 | 7/33 | Forsyth | 24—37 |
| 2,029,162 | 1/36 | Gibson | 24—31 |
| 2,079,965 | 5/37 | Reimel | 74—232 |
| 3,071,830 | 1/63 | Stolz | 24—33 |
| 3,086,264 | 4/63 | Tindall | 24—255 X |
| 3,093,005 | 6/63 | Dean | 24—31 X |

FOREIGN PATENTS

| | | |
|---|---|---|
| 129,496 | 3/79 | France. |
| 1,108 | 4/68 | Great Britain. |

WILLIAM FELDMAN, *Primary Examiner.*

DONLEY J. STOCKING, ALBERT H. KAMPE,
*Examiners.*